(12) United States Patent
Bleys et al.

(10) Patent No.: US 8,359,171 B2
(45) Date of Patent: Jan. 22, 2013

(54) ELECTRONIC PRESSURE GAUGE FOR MEASURING PRESSURE

(75) Inventors: Christian Bleys, Cerans-Foulletourte (FR); Fabrice Pin, Viroflay (FR); Philippe Deck, Montreuil (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 428 days.

(21) Appl. No.: 12/597,894

(22) PCT Filed: Apr. 1, 2008

(86) PCT No.: PCT/FR2008/050570
§ 371 (c)(1),
(2), (4) Date: Oct. 27, 2009

(87) PCT Pub. No.: WO2008/139081
PCT Pub. Date: Nov. 20, 2008

(65) Prior Publication Data
US 2010/0131213 A1    May 27, 2010

(30) Foreign Application Priority Data
May 3, 2007   (FR) ...................................... 07 54842

(51) Int. Cl.
*G01F 23/00* (2006.01)
*G01L 7/00* (2006.01)
*G01L 9/00* (2006.01)
(52) U.S. Cl. .............. 702/50; 702/98; 702/140; 73/708; 73/714
(58) Field of Classification Search .................... 702/50, 702/98, 140; 73/708, 714
See application file for complete search history.

(56) References Cited

U.S. PATENT DOCUMENTS

| 3,490,267 A | 1/1970 | Gordon |
| 4,147,893 A | 4/1979 | Matson |
| 4,420,748 A | 12/1983 | Jurgen |

(Continued)

FOREIGN PATENT DOCUMENTS

| CA | 2 425 851 | 10/2003 |
| DE | 40 09 741 | 10/1991 |

(Continued)

OTHER PUBLICATIONS

International Search Report for PCT/FR2008/050570.

(Continued)

*Primary Examiner* — Andrew Schechter
*Assistant Examiner* — L. Anderson
(74) *Attorney, Agent, or Firm* — Elwood L. Haynes (57) ABSTRACT

The invention relates to an electronic pressure gauge for measuring the pressure inside a container, particularly a pressurized gas cylinder, said pressure gauge including: at least one pressure sensor; an electronic unit designed to acquire, store and process data; and at least one information device capable of transmitting at least one item of information. The pressure gauge also includes a first radio with a reception port, said first radio being connected to the electronic unit so as to receive external data in order to modify the operation or the configuration of the pressure gauge. The reception port of the first radio is designed to read data modulated in terms of the frequency and/or intensity of an external magnetic field at a first low frequency, for example a frequency between 50 and 300 khz.

22 Claims, 2 Drawing Sheets

U.S. PATENT DOCUMENTS

| | | | |
|---|---|---|---|
| 4,734,688 A | 3/1988 | Adams | |
| 4,838,089 A | 6/1989 | Okada et al. | |
| 5,016,483 A | 5/1991 | Budinger | |
| 5,159,839 A | 11/1992 | Silber et al. | |
| 5,379,637 A | 1/1995 | Abowd et al. | |
| 5,440,477 A | 8/1995 | Rohrberg et al. | |
| 5,566,713 A | 10/1996 | Lhomer et al. | |
| 5,648,765 A | 7/1997 | Cresap et al. | |
| 5,738,145 A | 4/1998 | Daicho et al. | |
| 6,137,417 A | 10/2000 | McDermott | |
| 6,182,713 B1 | 2/2001 | Deck et al. | |
| 6,229,448 B1 | 5/2001 | Bennett et al. | |
| 6,672,151 B1 | 1/2004 | Schultz et al. | |
| 6,789,126 B1 | 9/2004 | Saulpaugh et al. | |
| 7,104,124 B2 | 9/2006 | Stabile et al. | |
| 2001/0045892 A1 | 11/2001 | Thomas et al. | |
| 2002/0170347 A1 | 11/2002 | Stabile et al. | |
| 2003/0158698 A1* | 8/2003 | Glazerbrook | 702/140 |
| 2003/0229603 A1 | 12/2003 | Childress et al. | |
| 2004/0041709 A1 | 3/2004 | Forster | |
| 2004/0045608 A1 | 3/2004 | Peters et al. | |
| 2004/0113813 A1* | 6/2004 | Henson et al. | 340/870.07 |
| 2004/0187095 A1 | 9/2004 | Gilfix et al. | |
| 2005/0083198 A1 | 4/2005 | Bulin et al. | |
| 2005/0210990 A1 | 9/2005 | Hayashi et al. | |
| 2005/0274166 A1 | 12/2005 | Wu et al. | |
| 2006/0011475 A1 | 1/2006 | Lin et al. | |
| 2006/0243347 A1 | 11/2006 | Humphrey | |
| 2008/0009257 A1* | 1/2008 | Safarian et al. | 455/307 |
| 2008/0221809 A1* | 9/2008 | Dix et al. | 702/36 |
| 2009/0040049 A1 | 2/2009 | Delecourt et al. | |
| 2010/0132437 A1 | 6/2010 | Bleys et al. | |
| 2010/0132474 A1 | 6/2010 | Bleys et al. | |
| 2010/0197233 A1* | 8/2010 | Kim et al. | 455/63.1 |

FOREIGN PATENT DOCUMENTS

| | | |
|---|---|---|
| DE | 101 46 457 | 4/2003 |
| DE | 202004000564 | 4/2004 |
| DE | 102006008427 | 10/2006 |
| EP | 0 180 662 | 5/1986 |
| EP | 0 292 606 | 11/1988 |
| EP | 0 451 897 | 10/1991 |
| EP | 0 486 922 | 5/1992 |
| EP | 0534876 | 3/1993 |
| EP | 0 733 889 | 9/1996 |
| EP | 0813022 | 12/1997 |
| EP | 0 860 354 | 8/1998 |
| EP | 0 863 794 | 9/1998 |
| EP | 0 916 891 | 5/1999 |
| EP | 0 982 121 | 3/2000 |
| EP | 1 055 862 | 11/2000 |
| EP | 1 126 202 | 8/2001 |
| EP | 1 145 740 | 10/2001 |
| EP | 1 191 276 | 3/2002 |
| EP | 1 760 640 | 3/2007 |
| EP | 1936255 | 6/2008 |
| EP | 1 988 327 | 11/2008 |
| FR | 2391455 | 12/1978 |
| FR | 2 504 650 | 10/1982 |
| FR | 2723202 | 2/1996 |
| FR | 2776768 | 10/1999 |
| FR | 2814794 | 4/2002 |
| FR | 2863037 | 6/2005 |
| FR | 2868160 | 9/2005 |
| FR | 2901873 | 12/2007 |
| FR | 2901874 | 12/2007 |
| FR | 2901875 | 12/2007 |
| FR | 2901876 | 12/2007 |
| FR | 2910591 | 6/2008 |
| FR | 2 915 798 | 11/2008 |
| FR | 2 915 799 | 11/2008 |
| FR | 2 915 801 | 11/2008 |
| FR | 2 915 821 | 11/2008 |
| FR | 2915800 | 11/2008 |
| GB | 1 319 764 | 6/1973 |
| GB | 2 098 758 | 11/1982 |
| GB | 2 189 887 | 11/1987 |
| GB | 2 236 839 | 4/1991 |
| GB | 2 274 331 | 7/1994 |
| GB | 2 415 072 | 12/2005 |
| IL | 100035 | 11/1994 |
| WO | WO 91 18266 | 11/1991 |
| WO | WO 98 05415 | 2/1998 |
| WO | WO 99 40553 | 8/1999 |
| WO | WO 01 69340 | 9/2001 |
| WO | WO 2004 053450 | 6/2004 |
| WO | WO 2005 093377 | 10/2005 |
| WO | WO 2006 065704 | 6/2006 |
| WO | WO 2006 074417 | 7/2006 |
| WO | WO 2007 138207 | 12/2007 |
| WO | WO 2007 138208 | 12/2007 |
| WO | WO 2008 139073 | 11/2008 |
| WO | WO 2008 139074 | 11/2008 |
| WO | WO 2008 139075 | 11/2008 |
| WO | WO 2008 139081 | 11/2008 |

OTHER PUBLICATIONS

French Search Report for related FR 2 868 160, Jan. 20, 2005.
International Search Report and Written Opinion for related PCT/FR2005/050177, Sep. 26, 2005.
French Search Report for related FR 2 901 873, Mar. 13, 2007.
International Search Report and Written Opinion for related PCT/FR2007/051229, Oct. 30, 2007.
French Search Report for related FR 2 901 874, Mar. 21, 2007.
International Search Report and Written Opinion for related PCT/FR2007/051230, Oct. 18, 2007.
French Search Report for related FR 2 901 875, Mar. 23, 2007.
French Search Report for related FR 2 901 876, Apr. 23, 2007.
European Search Report for related EP 07 30 1592, Jan. 18, 2008.
French Search Report for related FR 2 901 591, Jun. 13, 2007.
French Search Report for related FR 2 915 799, Jan. 9, 2008.
Written Opinion for related PCT/FR2008/050570, Dec. 4, 2008.
French Search Report for related FR 2 916 800, Sep. 21, 2007.
International Search Report and Written Opinion for related PCT/FR2008/050534, Sep. 9, 2008.
French Search Report for related FR 2 915 801, Sep. 25, 2007.
International Search Report and Written Opinion for related PCT/FR2008/050536, Sep. 9, 2008.
French Search Report for related FR 2 915 798, Sep. 24, 2007.
Written Opinion for related PCT/FR2008/050537, Sep. 26, 2008.
European Search Report for related EP 08 30 5103, Aug. 28, 2008.
French Search Report for related FR 2 901 821, Dec. 7, 2007.

* cited by examiner

ELECTRONIC PRESSURE GAUGE FOR MEASURING PRESSURE

This application is a 371 of International PCT Application PCT/FR2008/050570, filed Apr. 1, 2008, the entire contents of which are incorporated herein by reference.

FIELD OF THE INVENTION

The present invention relates to an electronic manometer for measuring the pressure prevailing inside a receptacle.

The invention relates in particular to an electronic manometer for measuring the pressure prevailing inside a receptacle, particularly a pressurized gas bottle, in which the manometer comprises at least one pressure sensor, an electronic unit designed for the acquisition, storage and processing of data, at least one information device capable of transmitting at least one item of information.

BACKGROUND

Such a manometer is described for example in document FR2868160A1.

Because they are reused many times, fluid bottles are successively faced with many cases of use with users who have different needs.

The information displayed or transmitted by the individual manometers measuring the pressure in the bottles are not adapted to the usage situations.

To solve this problem, such electronic manometers require many human interventions (actuation of buttons, sensors or other actuators). Because of this, such manometers have to provide means of actuation, interrogation or configuration which increase the structure and hence the cost of such devices. Moreover, the interventions on such electronic manometers may be the cause of operating errors and increase the electricity consumption of the manometer.

One object of the present invention is to alleviate some or all of the drawbacks of the prior art listed above.

SUMMARY OF THE INVENTION

The present invention provides an electronic manometer for measuring the pressure (P) prevailing inside a receptacle, particularly a pressurized gas bottle. The manometer comprises at least one pressure sensor, an electronic unit designed for the acquisition, storage and processing of data, and at least one information device capable of transmitting at least one item of information (P). The manometer further comprises a first radio comprising a reception port, the first radio being connected to the electronic unit in order to receive external data (D) for the purpose of modifying the operation or the configuration of the manometer. The reception port of the first radio is designed to read frequency-modulated and/or external magnetic field strength-modulated data at a first frequency called low, for example between 50 and 300 KHz. The first radio comprises a first radio transmission port connected to the electronic unit in order to transmit information (P) from the manometer, the first transmission port and the reception port of the first radio having an operating frequency substantially identical in transmission and in reception. The manometer also comprises a second radio that comprises only a transmission port, the second radio being connected to the electronic unit in order to wirelessly transmit information (P) particularly concerning the operation of the manometer. The transmission port of the second radio is designed to transmit frequency modulation and/or magnetic field strength modulation data at a second frequency called high, higher than the first frequency of the first radio, for example between 300 KHz and 800 MHz. The present invention further provides for the use of the manometer and to a system that includes the manometer.

DETAILED DESCRIPTION OF THE INVENTION

For this purpose, the manometer according to the invention, moreover according to the generic definition that the above preamble gives of it, is essentially characterized in that it comprises a first radio comprising a reception port, the first radio being connected to the electronic unit in order to receive external data for the purpose of modifying the operation or the configuration of the manometer.

Moreover, embodiments of the invention may comprise one or more of the following features:

- the electronic unit is designed to store and process first data called static such as information relating to the state or the identity of a receptacle or of the fluid contained in said receptacle, and the first radio is designed to receive first static data for the purpose of writing them or overwriting them in the electronic unit in order to modify the operation or the configuration of the manometer,
- the reception port of the first radio is designed to read frequency-modulated and/or external magnetic field strength-modulated data at a first frequency called low, for example between 50 and 300 KHz,
- the first radio or the electronic unit comprises a filter designed to filter a simplified transmission of external data relative to noise taking account only of the received signals having a transmission duration of more than a threshold preferably equal to approximately 100 ms,
- the manometer comprises a first radio transmission port connected to the electronic unit in order to transmit information from the manometer,
- the first radio transmission port comprises a magnetic field modulator designed to modulate an external magnetic field addressed to the manometer,
- the first transmission port belongs to the first radio, the first transmission port and the reception port of the first radio have an operating frequency substantially identical in transmission and in reception,
- the manometer comprises a second radio comprising a transmission port, the second radio being connected to the electronic unit in order to wirelessly transmit information (P) particularly concerning the operation of the manometer, the transmission port of the second radio is designed to transmit frequency modulation and/or magnetic field strength modulation data at a second frequency called high, for example between 300 KHz and 800 MHz, the electronic unit is designed to control the transmission of information by the second radio in response to a control signal received by the first radio, the electronic manometer is supplied by a wireless electric power supply system, the first radio has a communication frequency of the order of 125 KHz, the manometer comprises an information device comprising one or more of the elements from: a screen for displaying an item of information in alphanumeric and/or pictographic form, one or more light-emitting diodes, an audible warning, the manometer comprises at least one of: a sensor reading the temperature close to the manometer, a motion or movement sensor, a light sensor, a sound sensor, a satellite positioning system (GPS), at least one switch or actuator, the external data capable of being transmitted to the manometer for the purpose of modifying the operation or the configuration of the manometer comprise at least one of: the S.I. unit for displaying a physical magnitude such as the pressure or the autonomy (duration or volume remaining), the size of the receptacle to which the manometer is connected, a serial number of the receptacle to which the manometer is connected, the chemical nature of the fluid stored in the receptacle, a computer program for calculating an autonomy of fluid based on a measured pressure and if necessary a measured temperature, the electronic unit is designed to retransmit one or more data items via the second radio based on the information received by the first radio, the external data comprise actuation commands for initiating an operating action on the part of the manometer such as: the actuation of a counter, transmitting or cancelling an alarm, modifying a display and/or the displayed information, modifying a frequency of transmission via the second radio, the second radio has a communication frequency of the order of 433 MHz, the nature and/or the content of the data and information are automatically modified according to the current use of the manometer relative to several predefined operating modes at least by pressure values, the frequency of transmission of the information can be modified and if necessary automatically modified according to the current use of the manometer relative to several operating modes predefined at least by pressure values, the information or data include some or all of the following information: an identification number of the receptacle and/or of a valve or regulator valve mounted on the receptacle and/or of the manometer itself, the current operating mode of the receptacle, the computer application for controlling the manometer stored in the electronic unit, a program version number for controlling the manometer stored in the electronic unit, the maximum content value of the receptacle, the current measured pressure value, the current calculated fluid volume in the receptacle, an autonomy time calculated from the current measured pressure, the type of receptacle or regulator fitted to the receptacle from several predefined types, the load level of the electric power supply of the manometer, the current operating state of the manometer, the position of the manometer in particular according to a satellite positioning system, an item of information representative of an alarm or an operating defect, the manometer is designed to transmit at regular intervals a safety message comprising safety parameters, the processing system monitoring this safety message by comparison between the successive messages and/or by comparison of said safety message with a standard message for the purpose of detecting and indicating an intentional or accidental modification of the manometer or of the device, the manometer is designed to transmit at regular intervals a number representative of a predefined location stored in the electronic unit in order to link a unique identifier with a location, in order to make it possible to assign the radio messages to a location and in a determined zone, the processing system comprises a member for measuring the power of the received signal (RSSI) originating from a manometer and a processing logic in order to correlate this power with a calculated distance in order to locate the corresponding manometer(s), the processing system comprises one or more repeater receivers receiving and retransmitting the message originating from a manometer, the repeater receiver(s) making a slight modification to the signal in order to include therein, for example, the identifier of this receiver and thereby allow it to be geographically located, the manometer may comprise a system for recognizing a user or a user type (an identifier, for example, with a user type or access level from several predefined types), the manometer authorizing the changes of configuration and/or of use according to the user or the user type transmitting control data, the nature of the configuration may be dependent on one or more identifiers and/or one or more predefined user types (for example, a level of access or of authorization may or may not authorize the modification of one or more parameters), each user of the programming may have a specific identifier comprising an access level, the following access levels may be envisaged: manufacturer of the manometer, installer of the manometer on the receptacle, gasman, maintenance operator, (center) refill operator, logistics operator, user of the manometer, an electronic unit records the identifier of a user, particularly a user who has made a configuration change.

Figure 1:
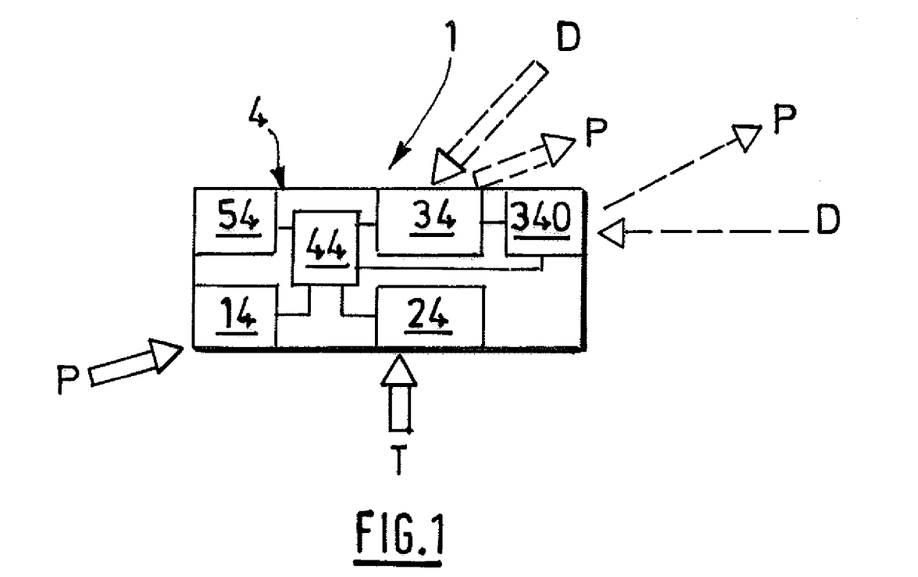
FIG. 1 represents a schematic partial view illustrating an example of the structure and operation of an electronic manometer according to one possible embodiment of the invention.
Figure 2:
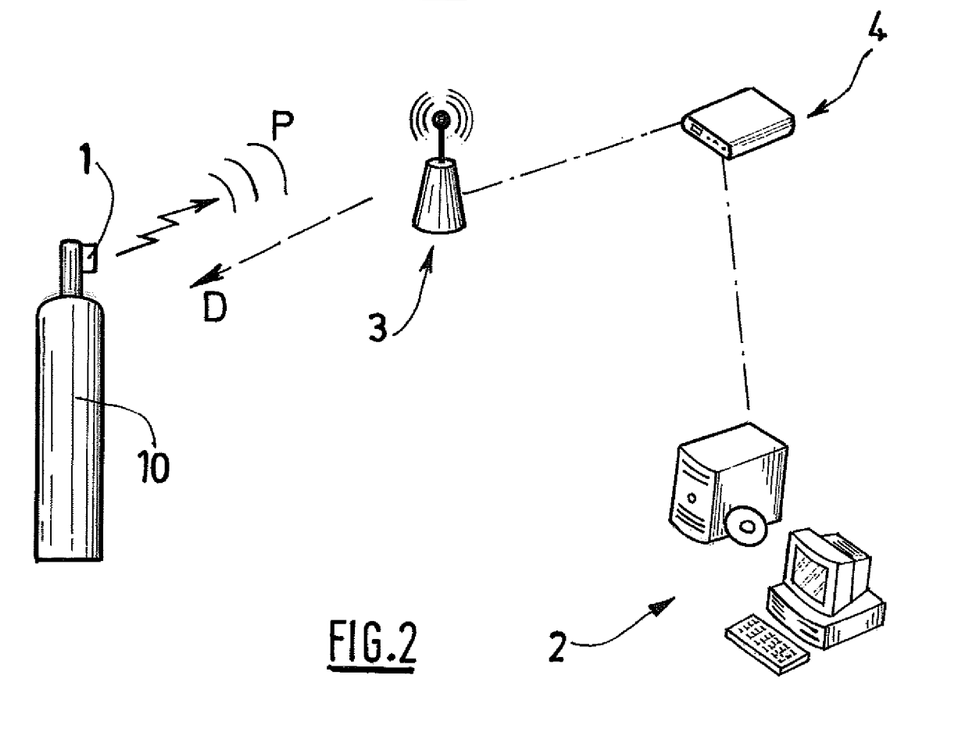
FIG. 2 represents a schematic view illustrating an example of operation of an electronic manometer in a processing system according to one possible embodiment of the invention.
Figure 3:
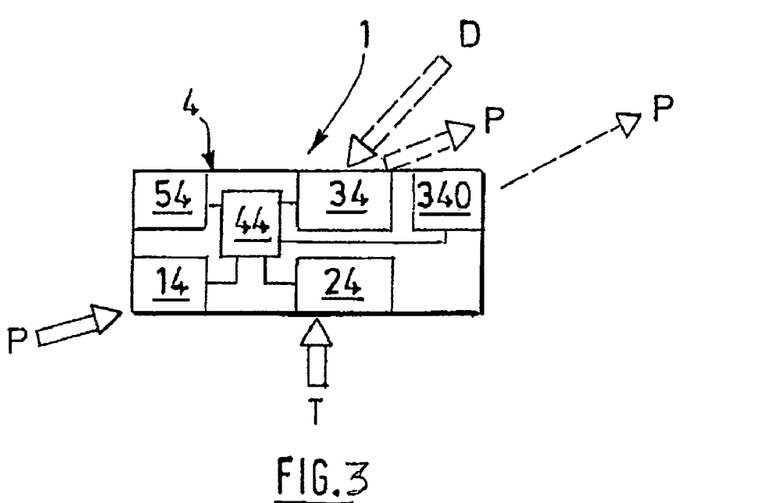
FIG. 3 represents a schematic partial view illustrating the structure and operation of an electronic manometer in a processing system according to one possible embodiment of the invention.
Figure 4:
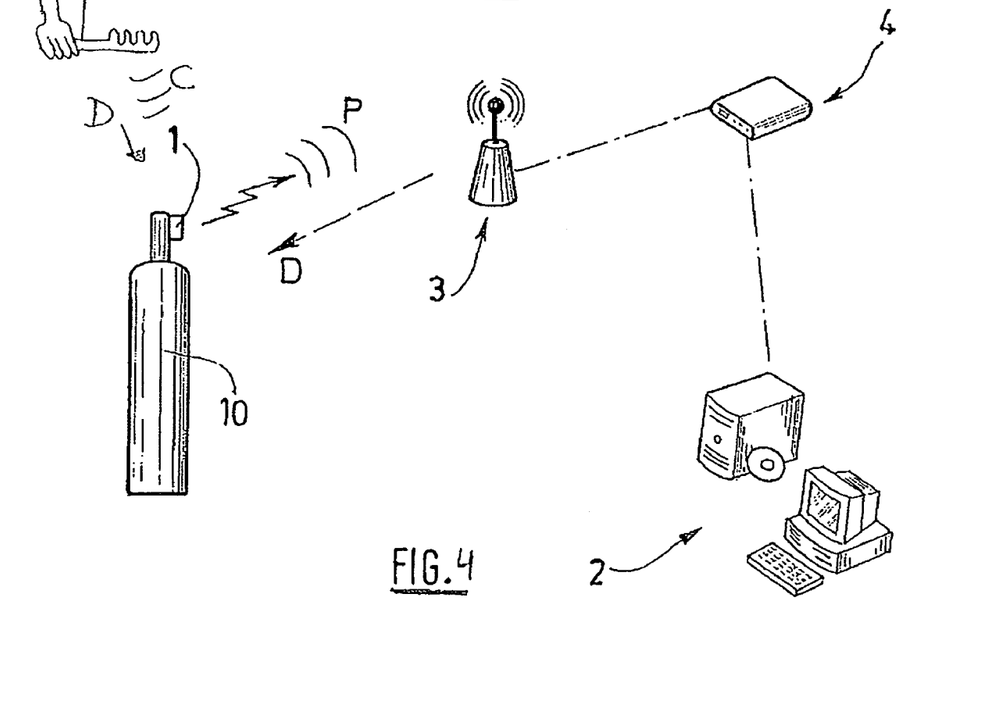
FIG. 4 represents a schematic partial view illustrating another example of operation of an electronic manometer in a processing system according to one possible embodiment of the invention.

Other particular features and advantages will appear on reading the following description, given with reference to the figures in which:

FIG. 1 represents a schematic partial view illustrating an example of the structure and operation of an electronic manometer according to one possible embodiment of the invention, FIG. 2 represents a schematic view illustrating an example of operation of an electronic manometer in a processing system according to one possible embodiment of the invention, FIG. 3 represents a schematic partial view illustrating the structure and operation of an electronic manometer in a processing system according to one possible embodiment of the invention, FIG. 4 represents a schematic partial view illustrating another example of operation of an electronic manometer in a processing system according to one possible embodiment of the invention.

The invention preferably applies to gas bottles with tap with or without built-in regulators, of the industrial or medical type, onto which an electronic pressure measurement system (electronic manometer) is fitted.

The invention may also be mounted and used on a fluid duct or pipe.

As shown in FIG. 1, the electronic manometer 1 may comprise within one and the same casing:
- one or more sensors 14 of pressure P,
- an electronic processing unit 44 (of the micro-processor type for example),
- a system 54 of wireless electric power supply (independent of an outside network) such as a battery, an accumulator, a photovoltaic cell, an induction system or equivalent,
- at least one information system 34 and/or communication system comprising one or more radios 34, 340 described in greater detail below.

The manometer 1 may also comprise at least one of the elements from:
- one or more sensors 24 of temperature T,
- a motion or movement sensor,
- a light sensor or a sound sensor,
- one or more buttons (an input interface),
- a radio receiver,
- one or more screens, one or more light-emitting diodes,
- an audible warning, a loudspeaker,
- a satellite positioning system (of the GPS type for example).

Preferably, the operating mode of the manometer and/or the information delivered by the latter are automatically adapted to the current operating state detected in real time and compared with predefined operating modes. The predefined operating modes are based for example on a typical cycle of pressure change which the manometer is capable of measuring during a conventional usage cycle of the receptacle.

The usage cycle of a gas bottle may be represented symbolically according to a pressure curve or a closed pressure loop. Each operating mode is defined, for example, by a pressure range and the previous operating mode according to a predefined chronological order.

The system can then adapt the data display and the operation of the manometer to the detected state. For example, the manometer can
- automatically transmit or display the specific information pertinent to the current state
- send or not send warning signals depending on the data but also the operating state.

The behavior of the manometer and the information shown or transmitted to the user may therefore be automatically adapted according to the current context and use, without human intervention via a button, a sensor or another actuator, and this increases the user-friendliness of the system.

Being able to dispense with the above technical means (buttons, sensors, etc.), it is possible to simplify the design and cost of the manometer and to improve its seal and its reliability.

This system or method may be applied in a particular and different manner to a multitude of industrial and medical applications.

The electronic unit 44 may therefore comprise stored parameters (which may or may not: be reprogrammable) defining various operating states and operating/communication modes (which also may or may not be reprogrammable) specially adapted to these states.

For example, the system can define three operating states linked in a loop in a chronological order:
- in use, (between a low pressure threshold S1 of the order of, for example, 5 to 10 bar and a first high pressure threshold S2 of the order of, for example, 200 bar),
- empty or being refilled, (between the low threshold S1 and a second high threshold 53 of the order of, for example, 220 bar),
- refilling terminated/cooling (between the second high threshold S3 and the first high threshold S2).

The state of use may if necessary itself be divided into two "substates":
- flowing (=being drawn off or in use), and
- stopped.

The system can define and detect another independent state of the cycle:
- a standby state corresponding, for example, to a storage state (manometer stopped or removed for example).

Depending on the operating mode detected based in particular on the pressure P measured by the manometer 1, the manometer 1 can carry out or modify one or more of the following actions (list given as a nonlimiting example):
- display data (pressure, calculated autonomy, etc.),
- wirelessly transmit data (pressure, autonomy, etc.), for example every minute,
- accept or deny modification of the stored parameters (reprogramming),
- acquire measured pressure P data, for example every 10 seconds,
- calculate a remaining autonomy (a function of the pressure and of the stored or programmed volume of the bottle), for example every 10 to 30 seconds and communicate it (display or wireless transmission),
- acquire measured temperature T data, for example every 60 seconds or less,
- verify the state of the battery periodically at intervals of less than 24 hours.

According to an advantageous particular feature, the manometer 1 comprises a first radio 34 called low frequency for receiving data D.

This first radio has a communication frequency of the order, for example, of 125 KHz. Preferably, the first radio is two-way, that is to say that it is capable of receiving data D and also of transmitting information P in this frequency range.

Accordingly, the first radio 34 comprises a reception port.

For example, the reception port of the first radio 34 detects or interprets a magnetic field emitted and modulated (in frequency and/or in amplitude) by an external system. The magnetic field is modulated according to the data D to be transmitted to the manometer 1.

The first radio 34 is also a data transmitter. Preferably, the manometer consumes little or no energy for transmission but uses the magnetic field D generated by the external system. For example, the first radio 34 comprises a transmission port capable of modulating the external signal. The receiving system (antenna or equivalent) can then decode the differences between the field that it has itself created and the real field modified by the manometer 1 and deduce therefrom the information transmitted by the manometer 1. The energy of the transmission of information P by the manometer 1 is therefore provided essentially by the outside system, usually less subjected to electric power supply constraints.

In another possible operating mode, the manometer 1 can receive data D, for example by detecting a simple field at its frequency (125 KHz for example, cf. FIG. 4, antenna A operated manually). Preferably, the field C emitted to the first radio 34 from the manometer 1 is uncoded but has a predetermined minimum duration. In response to these transmitted data D, the manometer 1 can then carry out one or more control actions that are predefined or dependent on the context and the data D. The verification of the minimum duration of the signal by the manometer 1 can be used to distinguish the "message" from possible noise or ambient radio interference in this frequency.

Therefore, the manometer can operate in a one-way communication (from the outside to the manometer 1). In this configuration, the first receiving radio 34 can serve as a remote actuator, such as a button, but without contact. This operation is particularly advantageous for example:

for actuating a meter within the manometer 1,
to trigger or acknowledge an alarm,
to control a change of display, etc.

It is possible to define data or information relating to the operation of the manometer 1 as "static" or "dynamic". It possible to designate "static", for example, as the features relative to the state of the receptacle or of the fluid that it contains (example: batch number, receptacle identifier, expiry date, pressure thresholds defining stored operating states, etc.). These static data or information can be modified by an external update, for example, particularly via the first radio 34. It is possible to designate "dynamic" as the features associated, for example, with the measurement of a physical magnitude of the fluid taken by the manometer: pressure, temperature read off at a sampling frequency. This sampling frequency may also be a static magnitude that can be modified via the first radio 34.

One advantage of this reception mode is that it requires only one extremely simple and low-cost device to give an instruction to the manometer 1. For example, it is possible to envisage external activation systems transmitting data: portable apparatus, badges, disposable element, or transmitters incorporated into apparatus surrounding the receptacle on which the manometer 1 is mounted (door frames, gates, bottle frame or basket, etc.).

The reception distance may be relatively greater than in the first two-way mode described, because the "message" does not need to be very precise or rigorous.

With the two-way mode of the first radio 34, it is therefore possible to program and configure some or all of the operation of the manometer 1. For example, control data D can be addressed that activate in the data storage and processing unit 44: a change of unit displayed or transmitted (pressure, duration, temperature, etc., the stored volume of the receptacle in which the pressure is measured, the serial number of the receptacle, etc.).

This reception mode may also correspond to writing in the data storage and processing unit 44. A read (transmission from the manometer 1) can be activated in particular for reasons of safety in order to check that the writing has been correctly done.

The transmission of information P by the first radio 34 can therefore make it possible to read values that are calculated or recorded in the manometer (unit 44), for example in the manner of a "black box", or meters, measurements or exact values more precise than those displayed, etc.

As shown in FIG. 1, preferably, the manometer 1 comprises a second transmitting radio 340. The second radio, called "high frequency", preferably operates at a higher frequency than that of the first radio 34, for example around 433 MHz.

This second radio can be provided more specifically for one or more receivers 3, 4, 2 (see FIG. 2) of a data processing system. The manometer 1 mounted on a receptacle 10 can therefore transmit information P to:

For a further understanding of the nature and objects for the present invention, reference should be made to the detailed description, taken in conjunction with the accompanying figures, in which like elements are given the same or analogous reference numbers and wherein:

one or more receivers 4 on a network,
on an office computer 2 or a server, or a pocket computer,
individual zone transfer modules 3,
one or more individual standalone receivers of the "pager" type (that is to say a small standalone module with a screen and no buttons or very few for receiving and displaying the information received by radio carried by users,
one or more remote individual standalone receivers, attached to the same assembly or the same receptacle, this being so, for example, in order to display an item of information in another location of the receptacle than the manometer itself (particularly of benefit in order to be able to use a display or orient a display while avoiding a fragile wire link or contact with a fluid),
one or more signal repeaters which can retransmit the signal received from the manometer 1 with greater power (since it can operate with a superior electric power supply, of the mains type). As a variant, the signal repeater can forward the message via another type of radio or network. Similarly, this repeater can advantageously include in the forwarded message its own position, fixed and known, in order to locate the zone around it where the manometer 1 is.

The manometer 1 (via the second radio 340 in particular) can transmit several types of data and in particular contextual messages that are functions of the current use of the manometer in the event of a defect. The content of the information P but also the transmission frequency can be variable. The information may include some or all of the following:

a unique identifier number, either of the receptacle 10, or of a valve or regulator valve, or of the manometer 1 itself,
the current application (the software controlling the manometer 1), a version number of said application,
the content of the receptacle,
the current pressure measured in the receptacle 10, if necessary more precise than that displayed on a screen of the manometer 1 or remotely, this being so in order, for example, to allow computer processes or calculations by a remote receiver 2,
the volume of fluid in the receptacle (calculated),
an item of information on the fluid autonomy (calculated),
the type of receptacle 1 or regulator mounted on the receptacle to which the manometer 1 is connected,
the power supply level (battery) of the manometer 1,
the state of operation of the manometer 1,
a position (of the GPS type),
an alarm or warning of a defect.

Preferably, the manometer 1 transmits at regular intervals a "safety" message comprising, for example, parameters relating to safety (pressure, temperature, etc.) and if necessary a combination of parameters affecting the correct operation of the manometer. This safety message can be monitored by an external receiver 2. This monitoring can be carried out, for example, by comparing the successive safety messages and/or by comparing safety messages relative to a standard message. In this manner, an external processing system can simply detect and thus give warning when there is an intentional or accidental modification however small but affecting the safety of the manometer 1 or of the installation.

The manometer 1 (in particular via the second radio 340) can also transmit information P at regular intervals, for example: a location number predefined by the user. It is thus possible to couple an identification number of the receptacle 10 or manometer 1 and a location. This makes it possible to assign the "normal" radio messages to a location or an application.

The manometer 1 can also transmit, via the second radio 340, information P in the form of a transmission frame forced by the first radio 34. That is to say that the data D received by the first radio 34 can understand an automatic command forcing a predefined (re)transmission of information by the second radio 340. It may be a predefined message, a contextual message (a function of the current state of use in particular) or information specifically received and transmitted by the first radio 34.

When the manometer (that is to say the receptacle 10 to which it is attached) needs to be located with greater accuracy, the transmission power of the radio or radios 34, 340 is chosen to be relatively low (approximately 10 meters for example) and the processing system comprises a large number of receivers 3 er of repeaters placed in known determined positions.

The receiver measuring the strength of the received signal (proportional in particular to the distance between the transmitter 34, 340 and the receiver 3), it is possible to have an indication of the distance at which the manometer 1 transmitting the signal is to be found (the "RSSI": "Receiver Signal Strength Indicator" technique).

In the case of a set of receivers 3, 4 operating in collaboration, it is also possible to locate the manometer 1 around the receiver receiving the signal of greatest intensity (if necessary weighted by a factor associated with its more or less favorable environment).

In the case of the use of signal repeaters, the retransmitted radio message may be slightly modified on the first retransmission in order to include, for example, an additional item of information such as the identifier of this receiver and thus allow geographic location.

The system according to the invention may therefore have a predictive operation and thereby a known electricity consumption. Specifically, from the design phase, it is possible to define all of the radio messages that will be transmitted in the life of the manometer 1, and to do so irrespective of the number of other adjacent manometers 1 (conversely, the conventional radio systems operate with a network logic in which, in order to prevent overlaps, the items of apparatus "listen" to one another and therefore behave differently depending on how many there are in the same zone).

The reliability of the system of transmission by the manometer 1 according to the invention can be increased in particular by:
 the repetition of the same message,
 the random time intervals between each message repetition,
 a possible reconstruction by the receiver of a correct message based on messages that are all defective,
 the very short duration of the messages which statistically limits a retrieval of messages from the various manometers.

In the case of two radios 34, 340, the manometer can benefit from the specifics of the two types of radio but also use new functions achieved by their collaboration as described above.

The manometer 1 is used and preferably controlled so as to call each of the radios 34, 340 in their lowest consumption configuration. Therefore, in the information P transmission mode, the high frequency second radio 340 is preferred. Reception is carried out by the first low frequency radio using a minimum of energy (external).

Conversely, the known systems comprise a single transmitting radio that is optimized for data transmission only.

This distribution of the functions in distinct dedicated radios greatly limits the electricity consumption of the manometer 1 which can thereby operate for a long period with one and the same battery (several years). This limits or renders unnecessary the battery-changing operations and procures a considerable economic saving by making it possible in particular to dispense with a battery-access system on the manometer 1.

The invention also relates to a method for controlling a manometer or for processing information from or to a manometer comprising some or all of the above features.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An electronic manometer for measuring the pressure (P) prevailing inside a receptacle, the manometer comprising:
 (a) at least one pressure sensor,
 (b) an electronic unit designed for the acquisition, storage and processing of data,
 (c) at least one information device capable of transmitting at least one item of information (P),
 (d) a first radio comprising
  (1) a reception port, the first radio being connected to the electronic unit in order to receive external data (D) for the purpose of modifying the operation or the configuration of the manometer, the reception port of the first radio being designed to read frequency-modulated and/or external magnetic field strength-modulated data at a first frequency called low frequency, and
  (2) a first radio transmission port connected to the electronic unit in order to transmit information (P) from the manometer, the first radio transmission port and the reception port of the first radio having an operating frequency substantially identical in transmission and in reception,
 (e) a second radio comprising only a transmission port, the second radio being connected to the electronic unit in order to wirelessly transmit information (P) particularly concerning the operation of the manometer, the transmission port of the second radio designed to transmit frequency modulation and/or magnetic field strength modulation data at a second frequency called high frequency that is higher than the first frequency of the first radio.

2. The manometer of claim 1, wherein the electronic unit is designed to store and process first data called static such as information relating to the state or the identity of a receptacle or of the fluid contained in the receptacle, and in that the first radio is designed to receive first static data (D) for the purpose of writing the data or overwriting the data in the electronic unit in order to modify the operation or the configuration of the manometer.

3. The manometer of claim 1, wherein the first radio or the electronic unit comprises a filter designed to filter a simplified transmission of external data (D) relative to noise while taking account only of the received signals having a transmission duration of more than a threshold equal to approximately 100 ms.

4. The manometer of claim 1, wherein the first radio transmission port comprises a magnetic field modulator designed to modulate an external magnetic field addressed to the manometer.

5. The manometer of claim 1, wherein the first reception port of the first radio comprises a module for detecting a simple uncoded magnetic field with a determined frequency and duration, the electronic unit of the manometer being designed to execute one or more predefined control actions as a function of the data (D) of the detected magnetic field and/or of the context.

6. The manometer of claim 1, wherein the electronic unit is designed to control the transmission of information (P) by the second radio in response to a control signal received by the first radio.

7. The manometer of claim 1, wherein the receptacle is a pressurized gas bottle.

8. The manometer of claim 7, wherein the low frequency is between 50 and 300 KHz and the high frequency is between 300 KHz and 800 MHz.

9. The manometer of claim 8, wherein the electronic unit is designed to store and process first data called static such as information relating to the state or the identity of a receptacle or of the fluid contained in the receptacle, and in that the first radio is designed to receive first static data (D) for the purpose of writing the data or overwriting the data in the electronic unit in order to modify the operation or the configuration of the manometer.

10. The manometer of claim 9, wherein the first radio or the electronic unit comprises a filter designed to filter a simplified transmission of external data (D) relative to noise while taking account only of the received signals having a transmission duration of more than a threshold equal to approximately 100 ms.

11. The manometer of claim 10, wherein the first radio transmission port comprises a magnetic field modulator designed to modulate an external magnetic field addressed to the manometer.

12. The manometer of claim 11, wherein the first reception port of the first radio comprises a module for detecting a simple uncoded magnetic field with a determined frequency and duration, the electronic unit of the manometer being designed to execute one or more predefined control actions as a function of the data (D) of the detected magnetic field and/or of the context.

13. The manometer of claim 12, wherein the electronic unit is designed to control the transmission of information (P) by the second radio in response to a control signal received by the first radio.

14. The manometer of claim 1, wherein the low frequency is between 50 and 300 KHz.

15. The manometer of claim 1, wherein the high frequency is between 300 KHz and 800 MHz.

16. The use of an electronic manometer for measuring the pressure (P) prevailing inside a receptacle, the manometer comprising:
(a) at least one pressure sensor,
(b) an electronic unit designed for the acquisition, storage and processing of data,
(c) at least one information device capable of transmitting at least one item of information (P),
(d) a first radio comprising
(1) a reception port, the first radio being connected to the electronic unit in order to receive external data (D) for the purpose of modifying the operation or the configuration of the manometer, the reception port of the first radio being designed to read frequency-modulated and/or external magnetic field strength-modulated data at a first frequency called low frequency, and
(2) a first radio transmission port connected to the electronic unit in order to transmit information (P) from the manometer, the first radio transmission port and the reception port of the first radio having an operating frequency substantially identical in transmission and in reception,
(e) a second radio comprising only a transmission port, the second radio being connected to the electronic unit in order to wirelessly transmit information (P) particularly concerning the operation of the manometer, the transmission port of the second radio designed to transmit frequency modulation and/or magnetic field strength modulation data at a second frequency called high frequency that is higher than the first frequency of the first radio,
wherein the electronic unit is designed to retransmit one or more data items via the second radio based on information received by the first radio, the information or data include some or all of the following information: an identification number of the receptacle and/or of a valve or regulator valve mounted on the receptacle and/or of the manometer itself, the current operating mode of the receptacle, the computer application for controlling the manometer stored in the electronic unit, a program version number for controlling the manometer stored in the electronic unit, the maximum content value of the receptacle, the current measured pressure value, the current calculated fluid volume in the receptacle, an autonomy time calculated from the current measured pressure, the type of receptacle or regulator fitted to the receptacle from several predefined types, the load level of the electric power supply of the manometer, the current operating state of the manometer, the position of the manometer in particular according to a satellite positioning system, an item of information representative of an alarm or an operating defect.

17. A system for processing at least one item of information relating to at least one pressurized fluid receptacle, said system comprising:
(a) a manometer for measuring the pressure (P) prevailing inside a receptacle, the manometer comprising:
(1) at least one pressure sensor,
(2) an electronic unit designed for the acquisition, storage and processing of data,
(3) at least one information device capable of transmitting at least one item of information (P),
(4) a first radio comprising
(A) a reception port, the first radio being connected to the electronic unit in order to receive external data (D) for the purpose of modifying the operation or the configuration of the manometer, the reception port of the first radio being designed to read frequency-modulated and/or external magnetic field strength-modulated data at a first frequency called low frequency, and
(B) a first radio transmission port connected to the electronic unit in order to transmit information (P) from the manometer, the first radio transmission port and the reception port of the first radio having an operating frequency substantially identical in transmission and in reception,
(5) a second radio comprising only a transmission port, the second radio being connected to the electronic unit in order to wirelessly transmit information (P) particularly concerning the operation of the manometer, the transmission port of the second radio designed to transmit frequency modulation and/or magnetic field strength modulation data at a second frequency called high frequency that is higher than the first frequency of the first radio comprising a manometer; and (b) a member for transmitting data (D) to the manometer.

18. The system of claim 17, wherein the manometer comprises at least a first radio transmission port connected to the electronic unit, and the processing system comprises at least one reception member from: several radio receivers networked together, a computer, a transfer receiver designed to forward the data remotely, a remote receiver comprising a display system that is remote from the manometer.

19. The system of claim 18, wherein the system comprises one or more repeater receivers receiving and retransmitting the message originating from a manometer, the repeater receiver(s) making a slight modification to the signal in order to include therein the identifier of this receiver and thereby allow it to be geographically located.

20. The system of claim 19, wherein the manometer is designed to transmit at regular intervals a safety message comprising safety parameters, the processing system monitoring this safety message by comparison between the successive messages and/or by comparison of said safety message with a standard message for the purpose of detecting and indicating an intentional or accidental modification of the manometer or of the device.

21. The system of claim 17, wherein the system comprises one or more repeater receivers receiving and retransmitting the message originating from a manometer, the repeater receiver(s) making a slight modification to the signal in order to include therein the identifier of the repeater receiver and thereby allow it to be geographically located.

22. The system of claim 17, wherein the manometer is designed to transmit at regular intervals a safety message comprising safety parameters, the processing system monitoring this safety message by comparison between the successive messages and/or by comparison of said safety message with a standard message for the purpose of detecting and indicating an intentional or accidental modification of the manometer or of the device.

* * * * *